United States Patent
Jeong et al.

(10) Patent No.: US 8,817,602 B2
(45) Date of Patent: Aug. 26, 2014

(54) METHOD AND APPARATUS FOR SETTING RADIO LINK OF TERMINAL IN WHICH MULTIPLE CARRIERS ARE INTEGRATED IN MOBILE COMMUNICATION SYSTEM

(75) Inventors: Kyeong In Jeong, Hwaseong-si (KR); Gert Jan Van Lieshout, Apeldoorn (NL); Soeng Hun Kim, Suwon-si (KR); Jung Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 13/509,360

(22) PCT Filed: Nov. 10, 2010

(86) PCT No.: PCT/KR2010/007908
§ 371 (c)(1),
(2), (4) Date: May 11, 2012

(87) PCT Pub. No.: WO2011/059223
PCT Pub. Date: May 19, 2011

(65) Prior Publication Data
US 2012/0224470 A1    Sep. 6, 2012

(30) Foreign Application Priority Data
Nov. 11, 2009   (KR) .................. 10-2009-0108751

(51) Int. Cl.
*G01R 31/08*   (2006.01)
(52) U.S. Cl.
USPC ......................................... 370/225; 370/216

(58) Field of Classification Search
USPC ................. 370/216, 217, 221, 225, 227, 228; 714/1–4.21
See application file for complete search history.

(56) References Cited

U.S. PATENT DOCUMENTS

2010/0113004 A1* 5/2010 Cave et al. ................. 455/422.1
2010/0304786 A1* 12/2010 Ou ............................. 455/552.1

FOREIGN PATENT DOCUMENTS

KR   10-2007-0073338 A   7/2007
KR   10-2008-0004039 A   1/2008

OTHER PUBLICATIONS

3GPP TS 36.300 version 9.1.0 Release 9, p. 57-58, Section 10.1.6 Radio Link Failure, Sep. 2009.*

* cited by examiner

*Primary Examiner* — Mark Rinehart
*Assistant Examiner* — Mang Yeung
(74) *Attorney, Agent, or Firm* — Jefferson IP Law, LLP

(57) ABSTRACT

The present invention relates to an apparatus and a method, wherein a terminal in which multiple carriers are integrated and sets a radio link by detecting and recovering radio link failure in a mobile communication system. The method comprises the steps of: setting a radio link in one serving cell in multiple carriers; checking a radio state of a primary carrier if failure of the radio link is detected; searching other cells adjacent to the serving cell by driving a timer, if the radio state is not matched with a preset radio condition; stopping the driving of the timer if the radio state is recovered while the timer is driven; and inactivating one of the multiple carriers.

14 Claims, 6 Drawing Sheets

METHOD AND APPARATUS FOR SETTING RADIO LINK OF TERMINAL IN WHICH MULTIPLE CARRIERS ARE INTEGRATED IN MOBILE COMMUNICATION SYSTEM

BACKGROUND OF THE INVENTION

1. Field of the Invention

The present invention relates to a communication apparatus and method for a mobile communication system and, in particularly, to a radio link configuration method and apparatus of a terminal for communicating data with a base station over multiple carriers aggregated in a mobile communication system.

2. Description of the Related Art

Mobile communication systems have developed to provide the subscribers with voice communication services on the move. With the rapid advance of technologies, the mobile communication systems have evolved to support high speed data communication services as well as the standard voice communication services. Recently, as the next generation mobile communication system of the 3$^{rd}$ Generation Partnership Project (3GPP), Long Term Evolution (LTE) is under development. The LTE system is a technology for realizing high-speed packet-based communication at about 100 Mbps, aiming at commercialization in around 2010. Meanwhile, unlike the standard voice service, most of the data services are allocated resources according to the data amount to be transmitted and channel condition. Accordingly, in the wireless communication system such as cellular communication system, it is important to manage resource allocation based on the resource scheduled for data transmission, channel condition, and data amount to be transmitted. This is the fact even in the LTE system, and the base station scheduler manages and assigns radio resources. More recent studies have focused on the LTE-Advanced (LTE-A) for improving data rate with the adaptation of several new techniques. Carrier Aggregation (CA) is one of these newly introduced techniques. As compared to the data communication in which a terminal uses one downlink and one uplink carriers, the terminal supporting CA is capable of performing data communication over multiple downlink and multiple uplink carriers.

DISCLOSURE OF INVENTION

Technical Problem

Since the conventional radio link failure detection and recovery procedure has been designed in consideration of the terminal assigned a single downlink and a signal uplink carriers, it is impossible to adopt this procedure to the terminal which transmits and receives data on multiple aggregated uplink and downlink carriers without modification. There is therefore a need of defining an operation procedure of the CA-enabled terminal when per-carrier radio link failure is detected.

Solution to Problem

In accordance with an aspect of the present invention, a radio link configuration method of a terminal for communicating data through aggregated carriers including a primary carrier in a mobile communication system includes establishing a radio link in a serving cell of one of the carriers; checking, when radio link failure is detected, radio quality of the primary carrier; searching, when the radio quality fulfills a predetermined radio condition, neighbor cells around the serving cell with start of a timer; and terminating, when the radio link is recovered before expiry of the timer, the timer with deactivation of one of the aggregated carriers.

In accordance with another aspect of the present invention, a radio link configuration apparatus of a terminal for communicating data through aggregated carriers including a primary carrier in a mobile communication system includes a transceiver which establishes a radio link in a serving cell of one of the carriers; a radio quality checker which checks, when radio link failure is detected, radio quality of the primary carrier; a search executor which searches, when the radio quality fulfills a predetermined radio condition, neighbor cells around the serving cell with start of a timer; and a recovery executor which terminates, when the radio link is recovered before expiry of the timer, the timer and deactivates one of the aggregated carriers.

Advantageous Effects

The terminal for communicating data with a base station through multiple carriers aggregated in a mobile communication system is capable of performing radio link failure detection and recovery efficiently. That is, if radio link failure is detected on a secondary carrier other than the primary carrier among aggregated carriers and if the radio link is not recovered on the secondary carrier before expiry of a timer, the UE does not perform measurement to discover a cell suitable for receiving the normal service, resulting in reduction of UE's power waste. If the probability of the radio link failure is high on the primary carrier, the UE performs measurement to discover the cell suitable for receiving the normal service on a secondary carrier so as to reduce the delay for radio link connection re-establishment when the radio link failure is detected on the primary carrier afterward.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In the following description, the term "primary carrier" denotes a carrier referenced for security and mobility among the carriers aggregated for use by a terminal and is interchangeably used with the term "first carrier." The term "secondary carrier" denotes at least one carrier other than the primary carrier.

Figure 1:
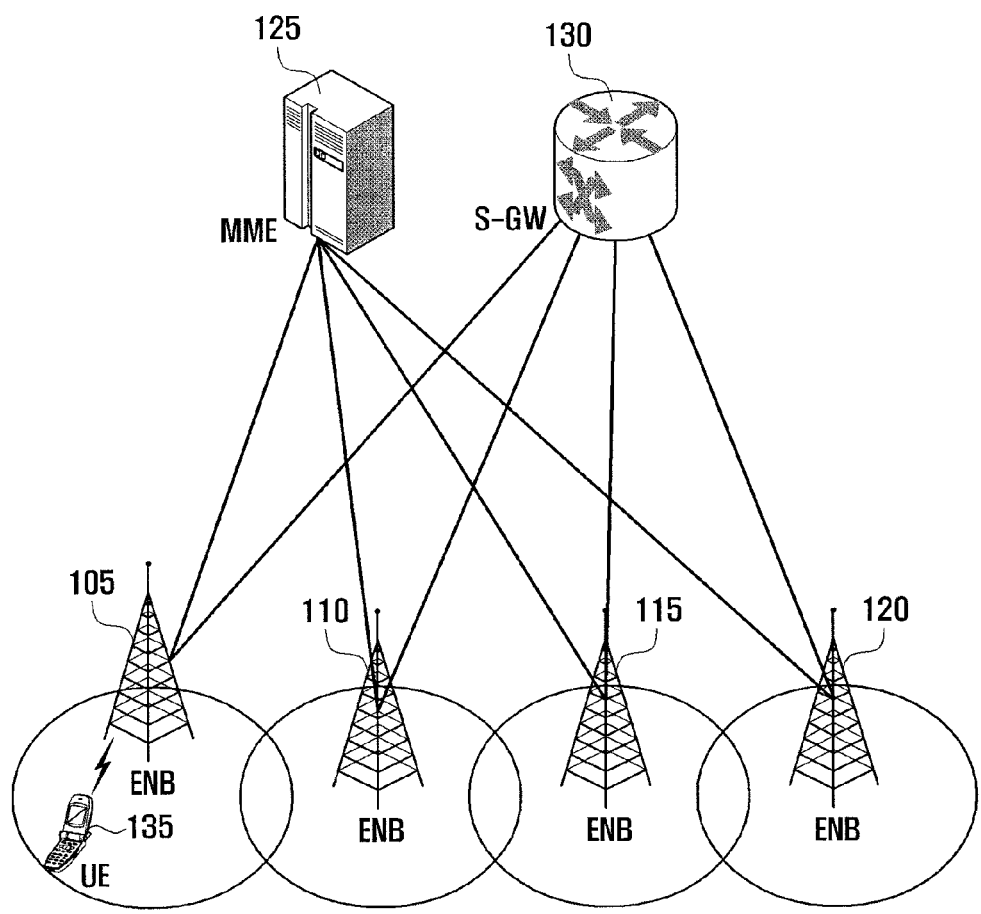
FIG. 1 is a diagram illustrating the architecture of an LTE system to which the present invention is applied.

FIG. 1 is a diagram illustrating the architecture of an LTE system to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130. In FIG. 1, the eNBs 105, 110, 115, and 120 correspond to legacy node Bs of Universal Mobile Communications System (UMTS). The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
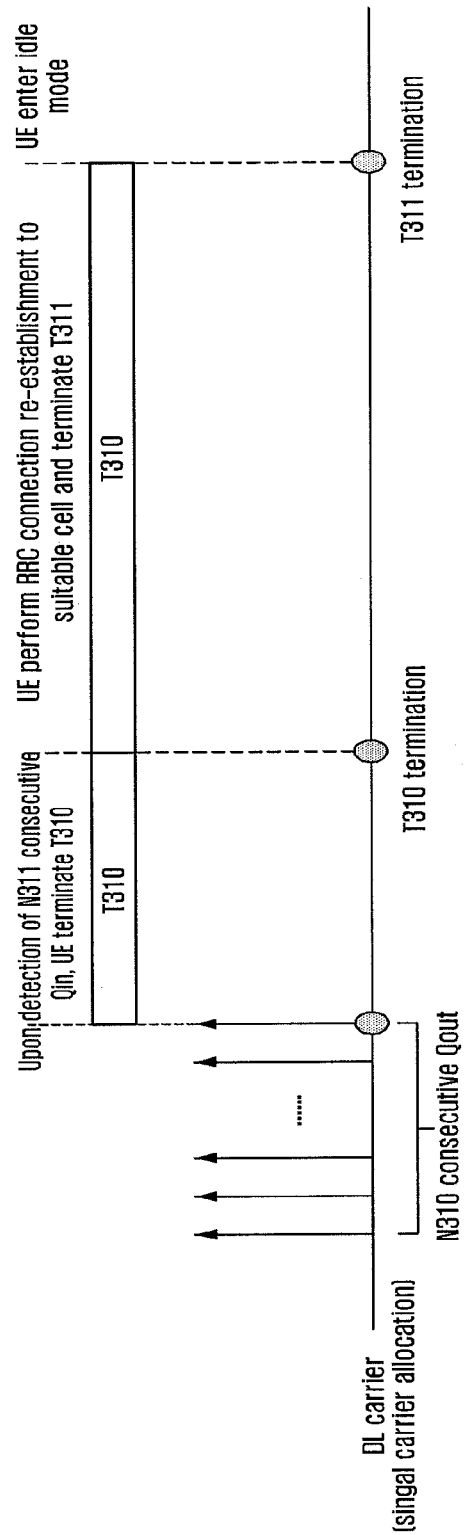
FIG. 2 is a diagram illustrating a radio link failure detection and recovery mechanism adopted in a 3GPP LTE system.

FIG. 2 is a diagram illustrating a radio link failure detection and recovery mechanism adopted in a 3GPP LTE system.

Referring to FIG. 2, the radio link failure detection is performed in such a way the UE monitors radio channel state to determine whether the connection to the eNB is broken, and the radio link recovery is performed in such a way that, when the radio link failure is detected, the UE waits for radio link recovery to the serving cell in a predetermined time rather than transitions to the idle mode immediately and, if the radio link recovery fails in the predetermined time, discovers a suitable cell for receiving the normal service among the neighbor cell to perform re-establishment procedure with the new cell. The normal service and the suitable cell for receiving the normal service follows the term 'normal service' and 'suitable cell' defined in the 3GPP standard 36.304, and the suitable cell discovery and re-establishment procedure for receiving the normal service after the radio link failure and multiple recovery failures follows 'RRC connection re-establishment procedure' defined in the 3GPP standard 36.331.

In case that a single downlink carrier is assigned to the UE, Qin or Qout information is signaled from the Physical layer to the Radio Resource Control (RRC) layer through Common Reference Signal (CRS) of the carrier. Qin is signaled when the CRS measurement result value on the carrier is greater than a predetermined reference value_1, and Qout is signaled when the CRS measurement result value on the carrier is less than a predetermined reference value_2. The CRS is the channel for measurement and channel estimation as defined in the 3GPP standard 36. 211, and the RRC layer is the layer for controlling radio resource follows the Radio Link Monitoring procedure specified in the 3GPP standard 36.133.

That is, if the N310 Qout signals are sent from the physical layer to the RRC layer in sequence, the UE starts a T310 timer. If N311 Q1 signals are received from the physical layer in sequence during the T310 timer period, the UE regards that the connection to the current serving cell is recovered. The CRS managed by the UE during the T310 timer period is the signal transmitted in the serving cell to which the UE has established the RRC connection. If it fails to receive N311 Qin signals in sequence from the physical layer before the expiry of the T310 timer, the UE starts the t311 timer and search neighbor cells (including the serving cell) for a suitable cell for receiving the normal service during the T311 timer period. If a suitable cell for receiving the normal service is discovered during the T311 timer period, the UE performs RRC connection re-establishment to the found cell. If the RRC connection re-establishment is successful, the UE can continue communication of control signal/data with the reestablished target cell without necessity of transition to idle mode. If it fails to discover a suitable cell during the T11 timer period, the UE transitions to the idle mode upon expiry of the T311 timer. The values of T310, N 310, T311, and N311 are signaled to the UE and determined in the ranges specified in the 3GPP standard 36.311, and the detail of the RRC connection re-establishment procedure follows the definition of the 3GPP standard 36.311 (RRC Connection Re-establishment).

Figure 3:
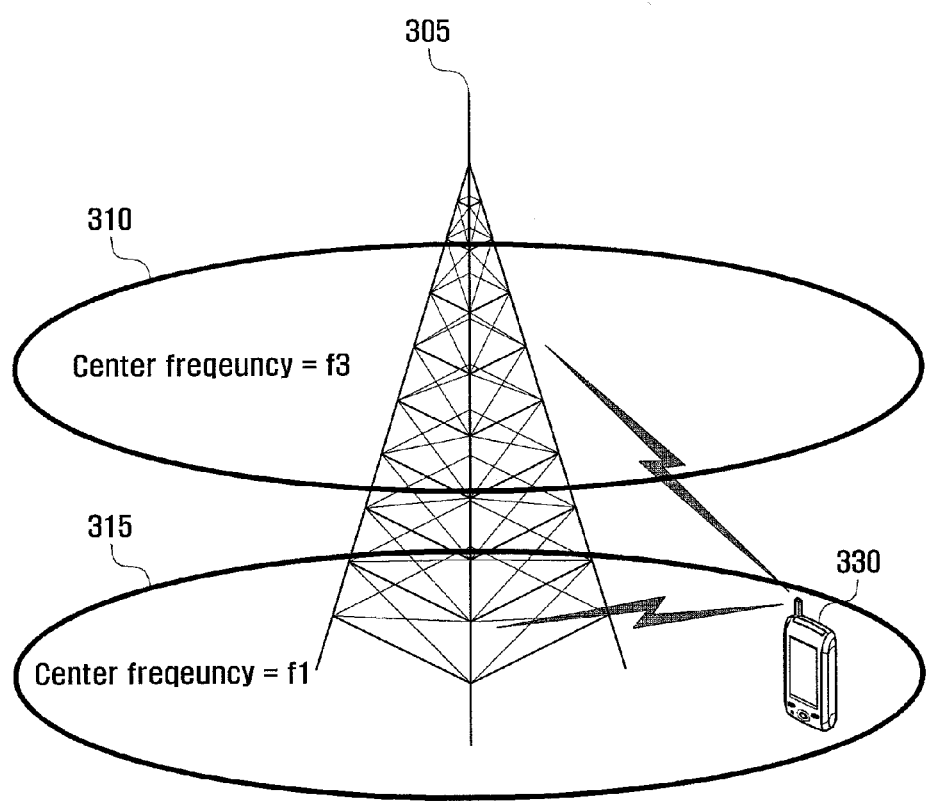
FIG. 3 is a diagram illustrating an exemplary situation of carrier aggregation in the LTE system to which the present invention is applied.

FIG. 3 is a diagram illustrating an exemplary situation of carrier aggregation in the LTE system to which the present invention is applied.

Referring to FIG. 3, typically an eNB can use multiple carriers transmitted and receive in different frequency bands. For example, the eNB 305 can be configured to use the carrier 315 with center frequency f1 and the carrier 310 with center frequency f3. If carrier aggregation is not supported, the UE 330 has to transmit/receive data unit one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE. In case that a cell is configured with one downlink carrier and one uplink carrier as a conventional concept, the carrier aggregation can be understood as if the UE communicates data via multiple cells. With the use of carrier aggregation, the maximum data rate increases in proportion to the number of aggregated carriers.

If the radio link failure detection and recovery procedure designed for the UE having single downlink carrier capability is applied to the UE 330 having multiple downlink carrier aggregation capability, the unnecessarily frequent radio link failure detection and recovery procedure is likely to cause inefficiency and thus there is a need of defining efficient radio link failure detection and recovery procedure for the UE 330 having the multiple downlink carrier aggregation capability.

The present invention proposes an efficient radio link failure detection and recovery method of a UE for receiving the data transmitted by the eNB through a plurality downlink carriers aggregated. In the present invention, the procedure begins in the state where multiple carriers are activated among the aggregated carriers and the UE has established the radio link on the respective carriers.

If radio link failure is detected on one of multiple secondary downlink carriers excluding the primary carrier representing a specific cell referenced for security and mobility, the UE waits for the recovery of the radio link with the serving cell on the secondary carrier for the timier_1 duration. At this time, the primary and secondary carriers represent the serving cell and neighbor cells of the serving cell. If radio link failure is detected in a serving cell of a different carrier, the UE may detects the radio link failure on the corresponding carrier. If the radio link failure is detected, the UE starts the timier_1 to determine whether the radio link is recovered. If the radio link is recovered before the expiry of the timer_1, the UE stops the timer_1.

If it is failed to recovery the radio link with the serving cell of other carrier before the expiry of the timer_1, the UE checks the radio quality of the primary carrier. If the radio quality of the first carrier does not satisfy a predetermined level, the terminal starts the timer_2 to discover the neighbor cells around the serving cell. That is, if the radio quality of a specific/serving cell of the primary carrier to cause radio link failure or has caused the radio link failure already, the UE starts the timer_2 on the carrier, where the timer_1 has expired, to perform a measurement operation for discovery of the suitable cell for receiving the normal service among the neighbor cells (including the serving cell. Here, if the signal indicating that the CRS measurement value on the first carrier is less than a predetermined threshold value, i.e. Qout, is detected a predetermined number of times in sequence, if the time_1 and timer_2 start on the primary carrier, or if the radio quality of the primary carrier is less than a predetermined threshold value, the UE determines that the radio quality of the first carrier does not fulfill the radio level.

If the radio quality of the first carrier is recovered before the expiry of the timer_2, the UE stops the timer_2 and deactivates the other carrier among the plural carriers.

At this time, the timer_2 may be ended, when the radio quality of the specific/serving cell of the primary carrier becomes good enough not to cause radio link failure, if the timer_1 starts on the primary carrier and the radio link is recovered in the specific/serving cell before the expiry of the timer_1, or if the timer_2 starts on the primary carrier and a suitable cell for receiving the normal service is discovered among the neighbor cells (including the serving cell). If the timer_2 is stopped, the UE reports the radio quality information on the neighbor cells (including serving cell) of the secondary carrier to the eNB (when the neighbor cell having good radio quality is discovered on the secondary carriers) or deactivates the secondary carrier and regards that the carrier is not one of the aggregated ones (when no neighbor cell having good radio quality is detected on the carrier).

Meanwhile, if the radio quality of the primary carrier fulfills a predetermined radio quality at the time point when the timer_1 has expired on a secondary carrier but not the primary carrier, the UE deactivates the secondary carrier among the multiple carriers. That is, if the radio quality of the specific/serving cell of the primary carrier is good enough so as not to cause radio link failure, the UE deactivates the secondary carrier on which the timer_1 is terminated and regards the carriers as one of the aggregated carriers.

The timer_1 and timer_2 may be new timers set to the values different from those of the timers T310 and T311 described with reference to FIG. 2 without exclusion of reuse of the timers T310 and T311.

The above-described operation may be applied when the secondary carrier on which radio link failure is detected is a solitary carrier with the exception of the primary carrier in the aggregation. If multiple secondary carriers exist in the aggregation with the exception of the primary carrier and if radio link failure is detected on one of the secondary carriers, the UE waits for the radio link recovery with the serving cell of the secondary carrier before the expiry of the timer_1 and, if the timer_1 expires without radio link recovery, the UE deactivates the secondary carrier and excludes the carrier from the aggregation.

According to the proposed method, if radio link failure is detected on a secondary carrier but not the primary carrier and if the radio link is not recovered in the serving cell of the secondary carrier before the expiry of the timer_1, the UE skips performing measurement operation for discovering a suitable cell to receive the normal service, thereby minimizing power waste of the UE. In case that the probability of radio link failure is high on the primary carrier, the UE performs measurement operation to discover a suitable cell for receiving the normal service on the secondary carrier in advance so as to reduce the delay for the RRC connection re-establishment when the radio link failure is detected on the primary carrier afterward.

Figure 4:
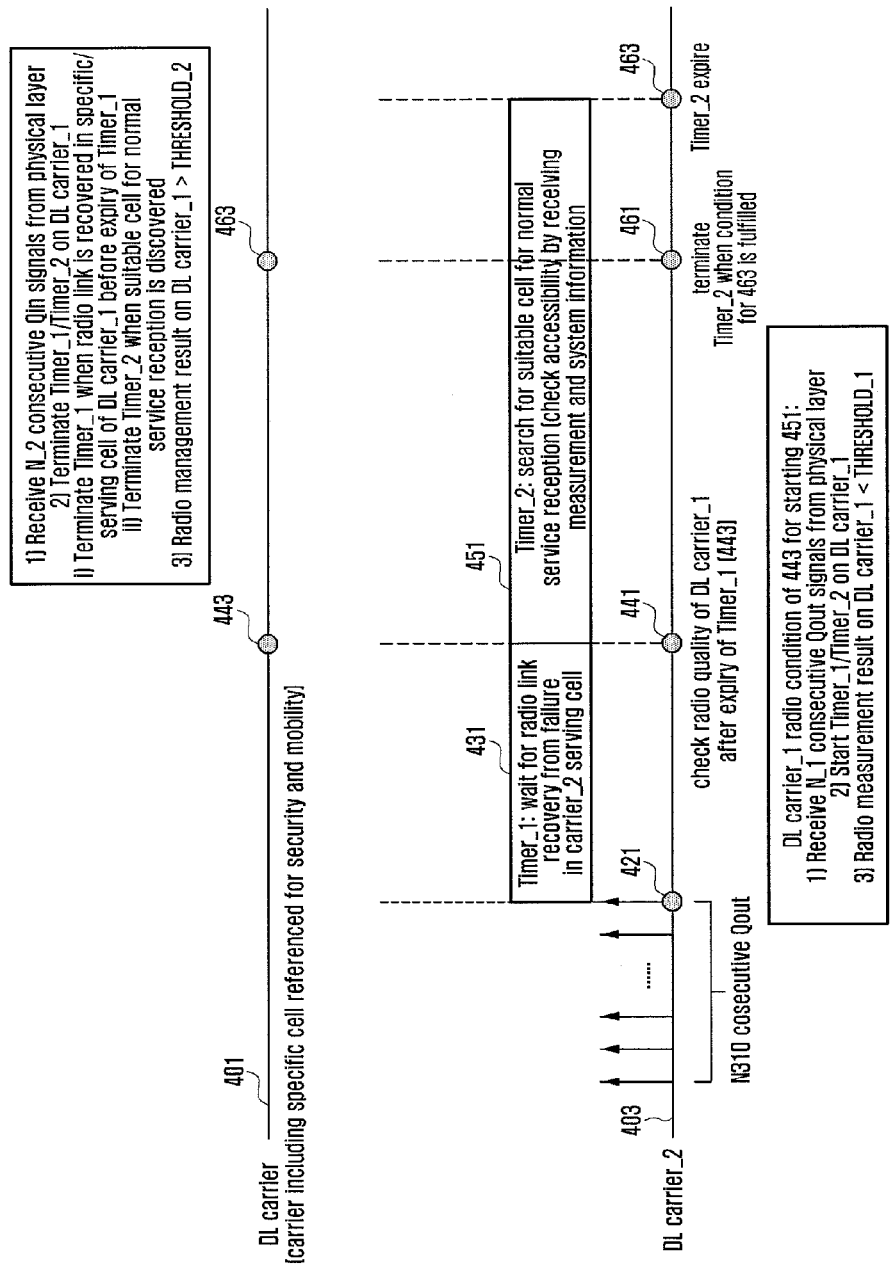
FIG. 4 is a diagram illustrating a radio link failure detection and recovery method of the CA-enabled UE according to an embodiment of the present invention.

FIG. 4 is a diagram illustrating a radio link failure detection and recovery method of the CA-enabled UE according to an embodiment of the present invention.

Referring to FIG. 4, it is assumed that the downlink carrier_1 401 is the primary carrier including a specific cell referenced for security and mobility. The downlink carrier_2 is a secondary carrier aggregated for use by the UE. In this embodiment, it is assumed that the carrier_1 401 and carrier_2 403 are aggregated for use by the UE.

In this embodiment, if N310 Qout signals are issued in sequence from the physical layer to the RRC layer for the carrier_2 403, the UE starts timer_1 at step 421. Before the expiry of the timer_1, the UE waits for radio link recovery with the serving cell on the carrier_2 403 at step 421. The radio link recovery may be performed in the same way as the radio link recovery procedure with T310 as described with reference to FIG. 2.

If the timer_1 expires (i.e. if radio link recovery with the serving cell fails on the carrier_2 403 before the expiry of the timer_1), the UE detects the radio link recovery failure at step 441 and checks the radio quality of the carrier_1 401 including the specific cell responsible for the security and mobility at step 443. If the radio quality of the carrier_1 401 is bad to cause radio link failure afterward, the UE starts the timer_2. Whether the radio quality of the carrier_1 401 is bad to cause radio link failure afterward may be determined depending on the following conditions: i) if N_1 consecutive Qout signals issued from the physical layer to the RRC layer for the carrier_1 401, ii) if the timer_1 or timer_2 starts on the carrier_1 401 (timer_1 starts when N310 consecutive Qout signals are received from the physical layer on the carrier_401, and the timer_2 starts when the timer_1 has started but the radio link to the specific/serving cell is not recovered on the carrier_1 401 before the expiry of the timer_1 401), and iii) the radio measurement result on the carrier_1 401 is less than a predetermined threshold (THRESHOLD_1). That is, if the above conditions are fulfilled, the UE starts the timer_2 on the carrier_2 403. The UE searches for a suitable cell for receiving the normal service (perform measurement and check accessibility to the cell with the receipt of system information) before the expiry of the timer_2 at step 451.

If the radio quality of the carrier_1 401 is improved such that no radio link failure is detected before the expiry of the timer_2 on the carrier_2 403 at step 451 or if radio link failure is detected on the carrier_1 401 but recovered soon, the UE detects this at step 463 and terminates the timer_2 at step 461. At this time, the recovery of the radio quality of the carrier_1 401 may be determined when the following conditions are fulfilled: i) N_2 consecutive Qin signals are issued from the physical layer to the RRC layer, ii) the timer_1 or timer_2 running on the carrier_1 401 is terminated (timer_1 termination occurs when the radio link is recovered in the specific/serving cell on the carrier_1 401 before the expiry of the timer_1 (the radio link is recovered when the N311 consecutive Qin signals are received from the physical layer as described with reference to FIG. 2), and the timer_2 determination occurs when a suitable cell for receiving the normal service is discovered before the expiry of the timer_2), and iii) the radio measurement result on the carrier_1 401 is greater than a predetermined threshold_2. If the timer_2 is terminated at step 461 or if the timer expires at step 463, the UE reports the radio quality information of the neighbor cells (including serving cell) to the eNB (e.g. when a neighbor cell having good radio quality on the carrier_2) or deactivates the carrier_2 and excludes the carrier from the aggregation (e.g. when no neighbor cell having the radio quality good enough on the carrier_2).

At this time, the timer_1 and timer_2 may be defined as new timers apart from the T310 and T311 as shown in FIG. 2 but it is not ruled out to reuse the T310 and 311. Although the description is directed to the embodiment in which two downlink carriers are aggregated, the present invention is not limited thereto. That is, the present invention is applicable as follows:

1) when a plurality of secondary carriers exists among the aggregated carriers and the radio link failure is detected on one of the secondary carriers other than the primary carrier.

2) when the carrier on which the radio link failure is detected is one secondary carrier other than the primary carrier (when there are multiple secondary carriers and the radio link failure is detected on the secondary carrier other than the primary carrier, the UE waits for the radio link recovery to the serving cell of the secondary carrier before the expiry of the timer_1; and if the radio link is not recovered before the expiry of the timer_1 with the serving cell of the secondary carrier, the UE deactivates the secondary carrier and excludes the secondary carrier from the aggregation).

Figure 5:
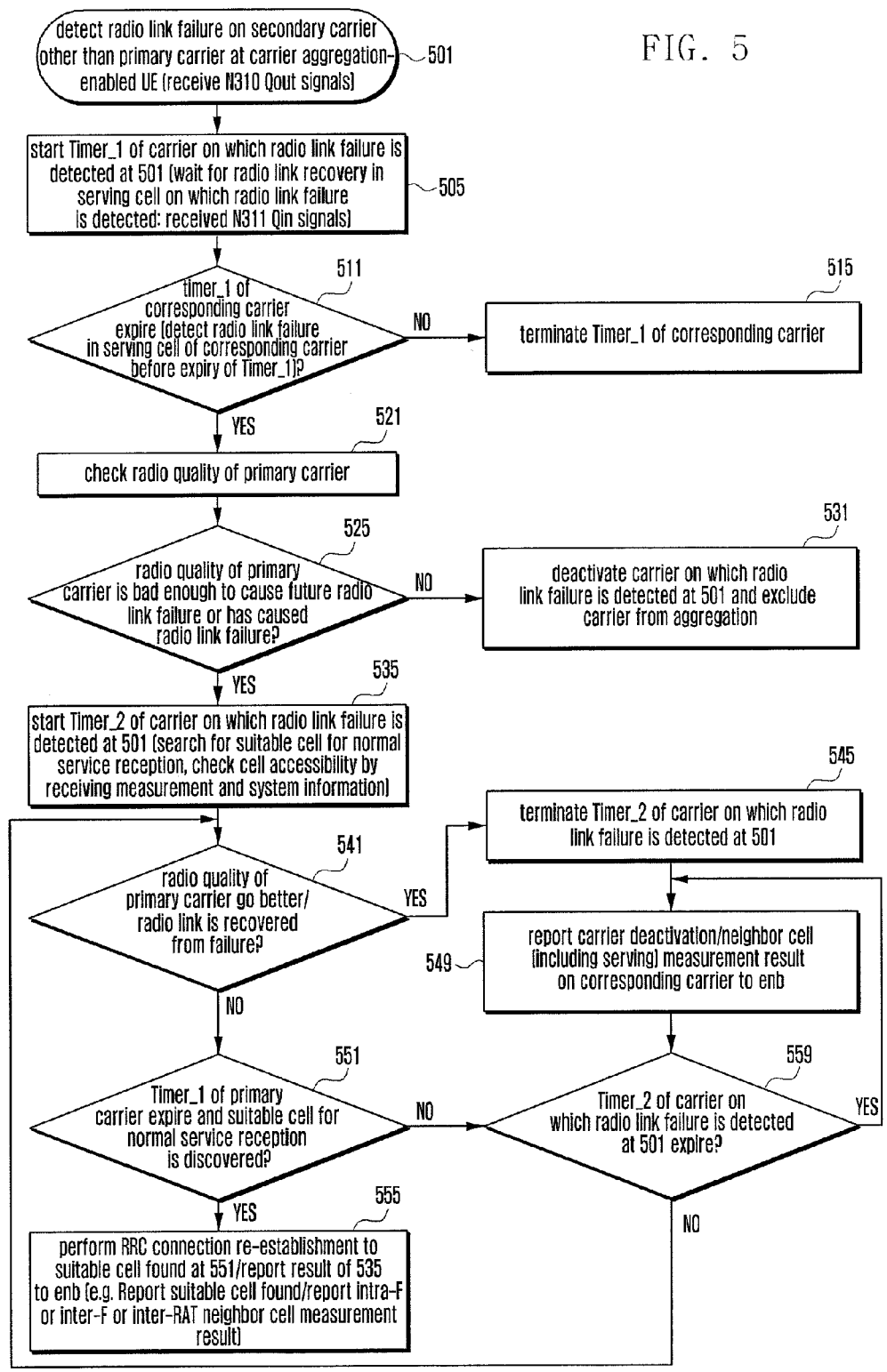
FIG. 5 is a flowchart illustrating the UE procedure according to an embodiment of the present invention.

FIG. 5 is a flowchart illustrating the UE procedure according to an embodiment of the present invention.

Referring to FIG. 5, the UE detects radio link failure on a secondary carrier other than the primary carrier among a plurality of aggregated carriers at step 501. At this time, if N310 consecutive Qout signals are issued from the physical layer, the UE can detect the radio link failure. Afterward, the UE starts the timer_1 of the secondary carrier on which the radio link failure is detected at step 505. At this time, the UE waits for the radio link recovery in the serving cell of the secondary carrier on which the radio link failure is detected. If N311 consecutive Qin signals are issued from the physical layer, the UE determines that the radio link is recovered in the serving cell of the secondary carrier. If the timer_1 of the secondary carrier expires (i.e. if the radio link recovery fails in the serving cell of the secondary carrier before the expiry of timer_1), the UE detects this at step 511 and checks the radio quality of the primary carrier at step 521. If the expiry of the timer_1 of the secondary carrier on which the radio link failure is detected is not detected at step 511 but the radio link is recovered in the serving cell of the secondary carrier before the expiry of the timer_1, the UE terminates the timer_1 of the secondary carrier at step 515.

Next, the UE determines whether the radio quality of the primary carrier is bad enough to cause the radio link failure afterward or has caused the radio link failure already at step 525 according to the radio link quality check result on the primary carrier at step 521. At this time, the UE may compare the radio quality of the primary carrier with a threshold value. For example, if the radio quality of the primary carrier is less than the threshold value, the UE may determine that the radio quality of the primary carrier is bad enough to cause radio link failure afterward or has caused radio link failure on the primary carrier. If it is determined that the radio quality of the primary carrier is bad enough to cause radio link failure afterward or has caused radio link failure on the primary carrier at step 525, the UE starts the timer_2 of the secondary carrier, at step 535, on which the radio link failure has been detected. The UE searches for a suitable cell for receiving the normal service before the expiry of the timer_2. This operation includes measurement and cell access check with the receipt of the system information. Since the determination conditions for use at step 525 have been described already with reference to FIG. 4, detailed description thereon is omitted herein. If the radio quality of the primary carrier does not satisfy the conditions at step 525, the UE deactivates the secondary carrier on which the radio link failure has been detected and excludes the deactivated carrier from the aggregation.

If the radio quality of the primary goes better or if the radio link failure has been detected but recovered soon, the UE detects this at step 541 and terminates the timer_2 of the secondary carrier on which the radio link failure has been detected at step 545. Next, the UE deactivates the secondary carrier and/or reports the measurement result on the neighbor cells of the secondary carrier (including serving cell) to the eNB at step 549. Since the exemplary determination conditions available at step 541 have been described with reference to FIG. 4, detailed description thereon is omitted herein.

The UE determines whether the timer_1 of the primary carrier has expired and a suitable cell for receiving the normal service is discovered during the operation of step 535 at step 551. If a suitable cell is discovered at step 551, the UE performs RRC connection re-establishment to the suitable cell at step 555 or reports the result of step 535 (e.g. the information on the suitable cell discovered at step 535 or intra-frequency/inter-frequency/inter-Radio Access Technology neighbor cell measurement result) to the eNB at step 555. If no suitable cell is discovered at step 551 and the timer_2 of the secondary carrier on which the radio link failure has been detected expires, the UE detects this at step 559 and deactivates the secondary carrier or reports the neighbor cell (including serving cell) measurement result on the secondary carrier to the eNB at step 549.

Figure 6:
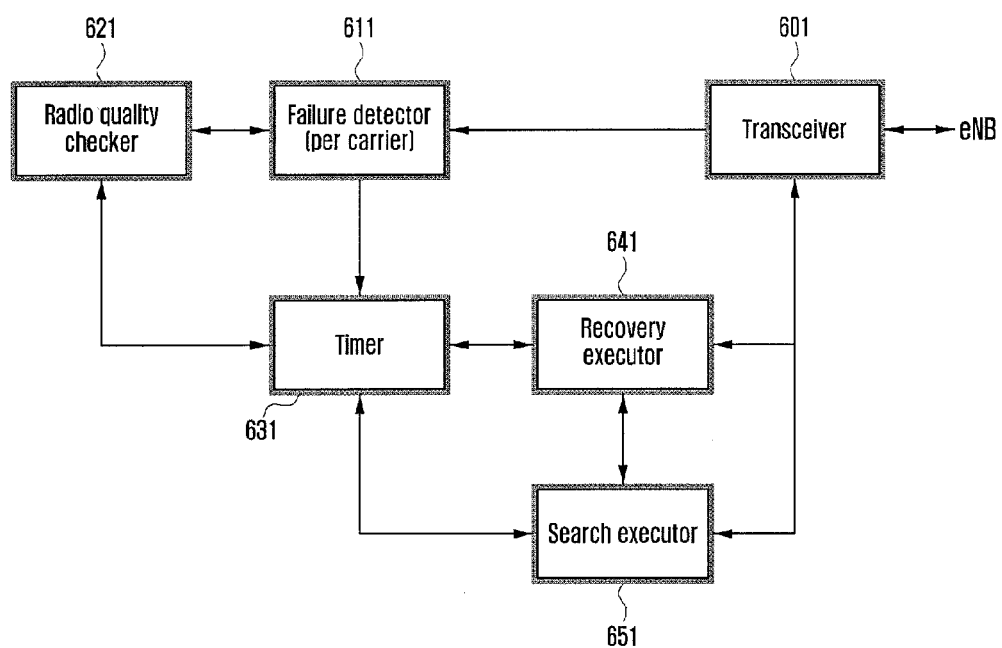
FIG. 6 is a block diagram illustrating a configuration of the UE according to an embodiment of the present invention.

FIG. 6 is a block diagram illustrating a configuration of the UE according to an embodiment of the present invention.

Referring to FIG. 6, the UE according to this embodiment includes a transceiver 601, a failure detector 611, a radio quality checker 621, a timer 631, a recovery executor 641, and search executer 651.

The transceiver 601 configures the carrier aggregation of a plurality carriers for communication with the eNB and radio links in the mobile communication and communicates data with the eNB. For this purpose, the transceiver 601 measures CRS and transmits and receives control information and data. The failure detector 611 uses the CRS measurement value as the input information for detecting radio link failure and performs radio link failure detection per carrier in carrier aggregation mode. If the failure detector 611 detects radio link failure on a secondary carrier other than the primary carrier, the timer 631 starts trimer_1. The recovery executer 641 waits for radio link recovery on the secondary carrier where the radio link failure has been detected before the expiry of timer_1. If the radio link is recovered in the serving cell of the secondary carrier before the expiry of the timer_1, the timer 631 terminates the timer_1. If the radio link is not recovered in the serving cell of the secondary carrier before the expiry of the timer_1 of the timer 631, the radio quality checker 621 checks the radio quality of the primary carrier. If the radio quality of the primary carrier is greater than a threshold value, the recovery executor 641 deactivates the secondary carrier in the aggregation.

Otherwise, if the radio quality of the primary carrier is less than the threshold value, the timer 631 starts timer_2 on a secondary carrier other than the primary carrier where the radio link failure has been detected or the recovery executor 641 deactivates the secondary carrier immediately without start of timer_2 and excludes the secondary carrier from the aggregation. If the timer_2 starts on the secondary carrier, the search executor 651 takes an action for discovery a suitable cell to receive the normal service. If the radio quality checker 621 detects that the radio quality of the primary carrier goes better to be greater than the threshold value or the radio link is recovered from the radio link failure on the secondary, the timer 631 terminates the timer_2. If the timer is terminated, the search executor 651 may terminate the suitable cell discovery operation for receiving the normal service. If the timer_2 starts on the primary carrier while discovering a cell suitable for the normal service before the expiry of the timer_2, the recovery executor 641 performs RRC connection re-establishment to the suitable cell immediately or reports the measurement result of the suitable cell discovered before the expiry of the timer_2 or the neighbor cell to the eNB.

That is, the transceiver 601 configures a radio link in one of serving cells on a plurality of carriers aggregated. If the failure detector 611 detects radio link failure, the radio quality checker 621 checks the radio quality of the primary carrier. If radio link failure is detected, the timer 631 starts timer_1, and the radio quality checker 621 may determine whether the radio link is recovered. If the radio link is recovered before the expiry of the timer_1, the timer 631 terminates the timer_1 and, otherwise, if the radio link is not discovered, the radio link checker 621 may check the radio quality of the primary carrier.

If the radio link checker 621 determines that the radio quality of the primary carrier does not fulfill a predetermined radio condition, the timer 631 starts timer_2, and the search executor 641 searches neighbor cells around the serving cell. If the radio quality of the primary carrier is recovered before the expiry of the timer_2, the timer 631 terminates the timer_2, and the recovery executor 641 controls to deactivate one of the aggregated carriers. If the radio quality of the primary carrier is not recovered before the expiry of the timer_2, the recovery executor 641 controls to configure the radio link in the found cell. Otherwise, if the radio link checker 621 determines that the radio quality of the primary carrier fulfills the radio condition, the recovery executor 641 controls to deactivate one of a plurality of carriers.

According to the present invention, the UE is capable of performing radio link failure discovery and recovery efficiently in carrier aggregation mode. That is, if radio link failure is detected on a secondary carrier other than the primary carrier among aggregated carriers and if the radio link is not recovered on the secondary carrier before expiry of a timer, the UE does not perform measurement to discover a cell suitable for receiving the normal service, resulting in reduction of UE's power waste. If the probability of the radio link failure is high on the primary carrier, the UE performs measurement to discover the cell suitable for receiving the normal service on a secondary carrier so as to reduce the delay for radio link connection re-establishment when the radio link failure is detected on the primary carrier afterward.

While the invention is described in terms of some specific examples and embodiments, it will be clear that this invention is not limited to these specific examples and embodiments and that many changes and modified embodiments will be obvious to those skilled in the art without departing from the true spirit and scope of the invention.

What is claimed is:

1. A radio link configuration method of a terminal for communicating data through aggregated carriers including a primary carrier in a mobile communication system, comprising:
   establishing a radio link in a serving cell of one of the carriers;
   checking, when radio link failure is detected, radio quality of the primary carrier;
   searching, when the radio quality fulfills a predetermined radio condition, neighbor cells around the serving cell with start of a timer; and
   terminating, when the radio link is recovered before expiry of the timer, the timer with deactivation of one of the aggregated carriers.

2. The radio link configuration method of claim 1, further comprising deactivating, when the radio quality fulfills the radio condition, one of the aggregated carriers.

3. The radio link configuration method of claim 1, further comprising establishing, when the radio link is not recovered before expiry of the timer, a radio link in a cell discovered.

4. The radio link configuration method of claim 1, wherein checking comprises:
   determining, when the radio link failure is detected, whether the radio link is recovered, with start of another timer;
   checking, when the another timer expires, the radio quality.

5. The radio link configuration method of claim 4, wherein checking further comprises terminating, when the radio link is recovered before expiry of the another timer, the another timer.

6. The radio link configuration method of claim 1, wherein searching comprises determining, when a predetermined number of signals indicating that a measurement value of a common reference signal on the primary carrier is less than a predetermined threshold are received consecutively, the timer and another timer start on the primary carrier, or the radio quality is less than a predetermined threshold value, that the radio quality does not fulfill the radio condition.

7. The radio link configuration method of claim 6, wherein terminating comprises determining, when a predetermined number of signals the measurement value of the common reference signal on the primary carrier is greater than the threshold are received consecutively, the timer and another timer are terminated on the primary carrier, or the radio quality is higher than an threshold value, that the radio quality is recovered.

8. A radio link configuration apparatus of a terminal for communicating data through aggregated carriers including a primary carrier in a mobile communication system, comprising:
   a transceiver which establishes a radio link in a serving cell of one of the carriers;
   a radio quality checker which checks, when radio link failure is detected, radio quality of the primary carrier;
   a search executor which searches, when the radio quality fulfills a predetermined radio condition, neighbor cells around the serving cell with start of a timer; and
   a recovery executor which terminates, when the radio link is recovered before expiry of the timer, the timer and deactivates one of the aggregated carriers.

9. The radio link configuration apparatus of claim 8, wherein the recovery executor controls deactivating, when the radio quality fulfills the radio condition, one of the aggregated carriers.

10. The radio link configuration apparatus of claim 8, wherein the recovery executor controls establishing, when the radio link is not recovered before expiry of the timer, a radio link in a cell discovered.

11. The radio link configuration apparatus of claim 8, wherein the radio quality checker determines, when the radio link failure is detected, whether the radio link is recovered, with start of another timer and checks, when the another timer expires, the radio quality.

12. The radio link configuration apparatus of claim 11, wherein the radio quality checker terminates, when the radio link is recovered before expiry of the another timer, the another timer.

13. The radio link configuration apparatus of claim 8, wherein the radio quality checker determines, when a predetermined number of signals indicating that a measurement value of a common reference signal on the primary carrier is less than a predetermined threshold are received consecutively, the timer and another timer start on the primary carrier, or the radio quality is less than a predetermined threshold value, that the radio quality does not fulfill the radio condition.

14. The radio link configuration apparatus of claim 13, wherein the radio quality checker determines, when a predetermined number of signals the measurement value of the common reference signal on the primary carrier is greater than the threshold are received consecutively, the timer and another timer are terminated on the primary carrier, or the radio quality is higher than an threshold value, that the radio quality is recovered.

* * * * *